United States Patent [19]

Hinz et al.

[11] Patent Number: 4,972,428
[45] Date of Patent: Nov. 20, 1990

[54] $CO_2$ WAVEGUIDE LASER

[75] Inventors: Alexander Hinz, Königsbronn; Franz Krug; Harald Volkenandt, both of Aalen-Ebnat, all of Fed. Rep. of Germany

[73] Assignee: Carl-Zeiss-Stiftung, Heidenheim, Fed. Rep. of Germany

[21] Appl. No.: 527,370

[22] Filed: May 23, 1990

[30] Foreign Application Priority Data

May 26, 1989 [DE] Fed. Rep. of Germany ....... 3917254

[51] Int. Cl.$^5$ ............................................... H01S 3/08
[52] U.S. Cl. ..................... 372/99; 372/108; 372/107; 372/102; 372/64; 372/55
[58] Field of Search ................... 372/33, 108, 107, 98, 372/99, 20, 29, 58, 93, 55, 102

[56] References Cited

U.S. PATENT DOCUMENTS

| | | | |
|---|---|---|---|
| 3,555,450 | 1/1971 | Rockwell, Jr. .................... | 372/103 |
| 3,717,823 | 2/1973 | Abdale et al. ..................... | 372/103 |
| 3,866,140 | 2/1975 | Hobart et al. ..................... | 372/93 |
| 4,426,705 | 1/1984 | Stevinson et al. .................. | 372/93 |
| 4,426,708 | 1/1984 | Van Etteger ....................... | 372/99 |

FOREIGN PATENT DOCUMENTS 0196082  11/1983  Japan ..................................... 372/58

OTHER PUBLICATIONS

Laser Handbook, vol. 3, North-Holland Publishing Company, 1979, pp. 72 and 78.

Primary Examiner—Leon Scott, Jr.
Attorney, Agent, or Firm—Walter Ottesen

[57] ABSTRACT

The invention is directed to a highly stable $CO_2$ waveguide laser wherein a resonator block is used which is made of a material having a low thermal expansion coefficient. The resonator block includes a window which is transparent for the wavelength of the laser. Laser reflectors are provided which are mounted by wringing to the resonator body and define a vacuum-tight seal of the resonator body. In this way, the resonator block has a permanently defined adjustment.

10 Claims, 1 Drawing Sheet

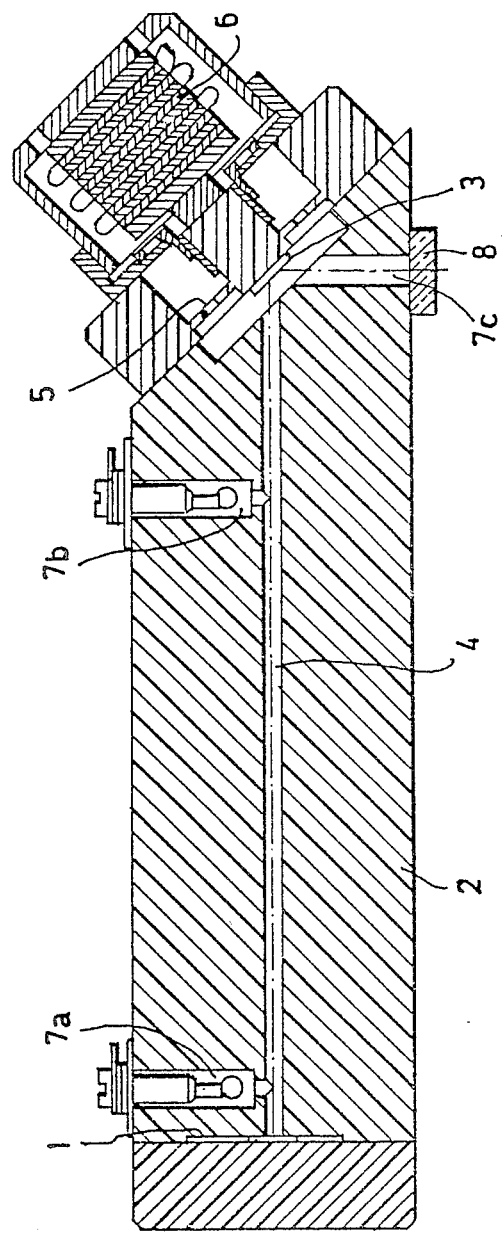

CO₂ WAVEGUIDE LASER

FIELD OF THE INVENTION

The invention relates to a $CO_2$ waveguide laser which includes a resonator block and two reflectors with a waveguide channel.

BACKGROUND OF THE INVENTION

Waveguide lasers of this type are, for example, used for laser radar systems which require local oscillators of an energy class less than 1 watt which are highly stable with respect to frequency for the superheterodyne reception with $CO_2$ lasers.

$CO_2$ waveguide lasers are described in the publication entitled "Laser Handbook", Volume 3, North-Holland Publishing Company 1979. A $CO_2$ waveguide laser having a separate arrangement of resonator structure and waveguide channel is described on page 78 of this publication. The arrangement is made of different materials. The resonator structure defines the mirror spacing and, in this known laser, comprises materials having low temperature expansion coefficients. A disadvantage of this laser is its sensitivity to vibration and shock which unfavorably influences its frequency stability.

A monolithic embodiment comprising one body is described on page 72 of the above-mentioned Laser Handbook and includes a resonator and a waveguide channel. This known configuration is assembled of ceramic materials having a relatively high temperature coefficient and therefore has the disadvantage of poor thermal longitudinal stability.

SUMMARY OF THE INVENTION

It is an object of the invention to provide a highly stable $CO_2$ waveguide laser which is free of the disadvantages which are associated with the $CO_2$ waveguide lasers known heretofore.

A feature of the $CO_2$ waveguide laser according to the invention is that the resonator block comprises a material having a low thermal expansion coefficient and that it includes a window transparent for the wavelength of the laser. The resonator block includes reflectors which are attached to the resonator block in a vacuum-tight manner by means of the wringing process. The wringing process is for example described in the reference text entitled "ABC der Optik" by K. M ze et al, Verlag Werner Dausein, 1972, page 293.

In an advantageous embodiment of the invention, a glass ceramic material is used for the resonator block and is known under the trade name of ZERODUR.

It is advantageous to provide one of the reflectors as a total reflector and the other as a reflection grating for wavelength selection of the laser.

It is advantageous to apply the total reflector and the reflection grating to a material having a low thermal expansion coefficient by means of a known evaporation or sputter process. The material to which the total reflector and reflection grating are applied should correspond to the material of the resonator block.

The gas discharge is preferably initiated with direct current or with high-frequency alternating current.

In the embodiment described, the laser beam is coupled out via the zero order of the reflection grating. The adjustment of the optical path length of the laser is advantageously obtained by a displacement of the grating in a direction perpendicular to its surface. The displacement path is thereby orientated approximately 45° to the resonator axis.

The Fresnel number F of the resonator is defined by $a^2/\lambda L$ wherein a is the capillary radius and L is the resonator length. In order to obtain a good mode quality of the laser, the Fresnel number F has preferably values between 0.85 and 0.9 or integer fractions thereof (0.85/N, wherein N is a natural number).

Other suitable gases than $CO_2$ can be used for another selection of emitted wavelength range. Such a suitable gas is, for example, CO.

The advantages obtained with the invention lie primarily in that the use of the wringing process for the reflectors permits a precise and permanent positioning thereof so that no further adjustment of the laser is required.

BRIEF DESCRIPTION OF THE DRAWING

The invention will now be described with reference to the single figure of the drawing which shows a schematic section view of the $CO_2$ waveguide laser according to the invention.

DESCRIPTION OF THE PREFERRED EMBODIMENTS OF THE INVENTION

Reference numeral 2 identifies the resonator block which is produced from a material having a low thermal expansion coefficient. A glass ceramic material is preferably used therefor and this material is known under the trade name ZERODUR. The waveguide channel 4 is arranged along the longitudinal axis of the resonator block 2. Bores (7a and 7b) are provided for receiving the anode and cathode and reference numeral 7c identifies the bore for guiding the beam.

The wringing surfaces for receiving the end mirror 1 configured as a total reflector and the reflection grating 3 are precisely aligned to the waveguide channel 4. The wringing surface corresponding to the end mirror 1 is at an angle of 90° to the resonator axis defined by waveguide channel 4 and the wringing surface corresponding to the reflection grating 3 is at an angle of approximately 45° to this axis. The exact value is defined by the grating constant and the laser wavelength to be selected.

The total reflector 1 is produced by evaporation deposition of gold or of other high reflective layers onto a polished substrate which is made of the same material as the resonator block 2. The reflection grating 3 is applied to the same or similar substrate material.

The laser beam is coupled out of the resonator via the zero order of the grating. A window 8 mounted on the resonator block 2 is transparent for the wavelength of the laser and defines a vacuum-tight closure. Since this window is not part of the laser resonator, it has no influence on the frequency stability of the laser.

End mirror 1 and reflection grating 3 are brought into position on the resonator block 2 by wringing the mirror and grating thereto. The end mirror 1 and reflection grating 3 define a vacuum-tight seal of the laser body. The laser thereby obtains a permanently defined adjustment. The resonator length and thereby the frequency stability is exclusively defined by the material which is used and which has a low coefficient of expansion. In the case of ZERODUR, a frequency stability of the laser ($f_o = 30$ THz) of more than 200 KHz/°C. is reached in the minimum expansion of this material. The influence of the thin layers of the total reflector and grating can be disregarded.

The laser plasma is excited by a longitudinal direct current discharge in the waveguide channel. However, it is within the purview of persons of ordinary skill to alternately use a high-frequency alternating current discharge for the excitation. The anode and cathode are provided in respective bores (7a and 7b) in the resonator block 2 and are seated in a vacuum-tight manner therein.

The reflection grating 3 can be applied to a substrate 5 which contains a ring-shaped membrane. The resonator length is finely tuned by displacing the grating. The required displacement is achieved with the aid of a piezo-ceramic disc pack 6. An effective displacement path of the dual membrane path is obtained by means of the arrangement of the grating substrate 5 at an angle of 45° to the resonator axis. This configuration affords a reduced stress on materials.

The Fresnel number F of the resonator is defined by the formula: $a^2/\lambda \cdot L$ wherein a is the capillary radius and L is the resonator length. The Fresnel number F of the resonator is adjusted to values between 0.85 and 0.9 or to integer fractions of this value to obtain a good mode quality and a good signal frequency of the laser.

It is understood that the foregoing description is that of the preferred embodiments of the invention and that various changes and modifications may be made thereto without departing from the spirit and scope of the invention as defined in the appended claims.

What is claimed is:

1. A $CO_2$ waveguide laser for operating at a predetermined wavelength, the $CO_2$ waveguide laser comprising:

a resonator block defining a resonator axis and being made of a material having a low thermal coefficient of expansion;

said resonator block defining a waveguide channel having respective longitudinal ends;

two reflectors mounted at corresponding ones of said ends of said waveguide channel;

said resonator block defining a beam-guiding passage extending from said waveguide channel;

a window transparent to said wavelength and being mounted on said block and across said passage; and, said reflectors and said block conjointly defining respective wringing surface interfaces for adheringly attaching said reflectors to said block in a vacuum-tight manner.

2. The $CO_2$ waveguide laser of claim 1, said resonator block being made of glass-ceramic.

3. The $CO_2$ waveguide laser of claim 2, one of said two reflectors being configured as an end reflector and the other one of said two reflectors being configured as a reflection grating.

4. The $CO_2$ waveguide laser of claim 3, each of said reflectors being evaporation deposited on a material having a low thermal coefficient of expansion.

5. The $CO_2$ waveguide laser of claim 3, each of said reflectors being sputter deposited on a material having a low thermal coefficient of expansion.

6. The $CO_2$ waveguide laser of claim 3, comprising electrode means for effecting a direct-current gas-discharge in said laser.

7. The $CO_2$ waveguide laser of claim 3, comprising electrode means for effecting an alternating-current gas-discharge in said laser.

8. The $CO_2$ waveguide laser of claim 3, wherein the laser beam is coupled out of said waveguide channel by the zero order of said reflection grating.

9. The $CO_2$ waveguide laser of claim 3, said reflectors being separated from each other by an optical path having a pregiven length; and, said laser further comprising adjusting means for adjusting said length of said optical path via said reflective grating at an angle of approximately 45° to said resonator axis.

10. The $CO_2$ waveguide laser of claim 1, wherein said resonator has a Fresnel number $(a^2/\lambda L)$ selected to lie in the range of 0.85 to 0.9 or integer fractions thereof.

* * * * *